United States Patent
Einsla et al.

(10) Patent No.: US 12,241,205 B2
(45) Date of Patent: Mar. 4, 2025

(54) THERMOSENSITIVE PAPER

(71) Applicant: Rohm and Haas Company, Collegeville, PA (US)

(72) Inventors: Brian R. Einsla, Collegeville, PA (US); Andrew Hejl, Lansdale, PA (US); Ethan C. Glor, Ambler, PA (US); Junsi Gu, Malvern, PA (US)

(73) Assignee: Rohm and Haas Company, Collegeville, PA (US)

( * ) Notice: Subject to any disclaimer, the term of this patent is extended or adjusted under 35 U.S.C. 154(b) by 0 days.

(21) Appl. No.: 18/713,463

(22) PCT Filed: Dec. 6, 2022

(86) PCT No.: PCT/US2022/051911
§ 371 (c)(1),
(2) Date: May 24, 2024

(87) PCT Pub. No.: WO2023/121864
PCT Pub. Date: Jun. 29, 2023

(65) Prior Publication Data
US 2024/0417930 A1    Dec. 19, 2024

Related U.S. Application Data

(60) Provisional application No. 63/291,493, filed on Dec. 20, 2021.

(51) Int. Cl.
| | | |
|---|---|---|
| *D21H 19/12* | (2006.01) |
| *B41M 5/333* | (2006.01) |
| *B41M 5/41* | (2006.01) |
| *B41M 5/44* | (2006.01) |
| *D21H 19/82* | (2006.01) |

(52) U.S. Cl.
CPC .......... *D21H 19/12* (2013.01); *B41M 5/3335* (2013.01); *B41M 5/41* (2013.01); *B41M 5/44* (2013.01); *D21H 19/828* (2013.01); *B41M 2205/04* (2013.01)

(58) Field of Classification Search
None
See application file for complete search history.

(56) References Cited

U.S. PATENT DOCUMENTS

| | | | |
|---|---|---|---|
| 4,929,590 A | 5/1990 | Maruta et al. | |
| 6,780,820 B2 | 8/2004 | Bobsein | |
| 10,189,958 B2 | 1/2019 | Brennan et al. | |
| 10,351,678 B2 | 7/2019 | Brennan et al. | |
| 10,730,334 B1 | 8/2020 | Vaughn | |
| 2002/0123425 A1* | 9/2002 | Bobsein | B41M 5/44 503/200 |
| 2009/0087662 A1 | 4/2009 | Yoshitani et al. | |
| 2016/0068640 A1* | 3/2016 | Brennan | C08J 9/0061 521/53 |
| 2019/0153172 A1 | 5/2019 | Brennan et al. | |
| 2020/0361227 A1* | 11/2020 | Vaughn | D21H 21/54 |

FOREIGN PATENT DOCUMENTS

EP    1134089    9/2001

* cited by examiner

*Primary Examiner* — Dennis R Cordray
(74) *Attorney, Agent, or Firm* — Reid S. Willis

(57) ABSTRACT

The present invention relates to a coated paper article with an intermediate basecoat layer comprising high void fraction porous hollow sphere polymer particles (HISPs). HSPs with very small pore area density and high void fraction result in increased optical density at a given print energy in thermal printing applications.

8 Claims, No Drawings

THERMOSENSITIVE PAPER

BACKGROUND OF THE INVENTION

The present invention relates to thermosensitive paper with a basecoat comprising porous hollow sphere pigments, particularly porous hollow sphere pigments with high void fraction.

Thermosensitive paper is a multilayered recording material that includes a paper substrate, an intermediate insulating layer comprising hollow sphere pigments (HSPs), and an image forming layer (see U.S. Pat. No. 10,730,334 B1). Printing performance in direct thermal printing applications depends largely on maximizing void fraction of the HSPs. The larger the void fraction, the less print energy required to create and image. However, void fraction alone is not predictive of print performance. It would therefore be an advantage in the field of thermal printing to provide HSPs that yield improved print performance.

SUMMARY OF THE INVENTION

The present invention addresses a need in the art by providing a coated paper article comprising:
a) a 40-µm to 500-µm thick paper substrate;
b) a 2-µm to 10-µm thick basecoat layer comprising porous multistage polymer particles and a binder; and
c) a 1-µm to 30-µm thick thermosensitive recording layer;
wherein the basecoat layer is disposed between the thermosensitive recording layer and the paper substrate;
wherein the porous multistage polymer particles have a shell-hollow core morphology, and a number-weighted average particle size in the range of from 500 nm to 3 µm;
wherein the shell comprises from 0.5 to 10 weight percent structural units of a salt of a carboxylic acid monomer, and from 90 to 99.5 weight percent structural units of styrene;
wherein at least 98 weight percent of the shell comprises structural units of styrene and the salt of the carboxylic acid monomer; and
wherein the pore area percent is in the range of from 0.005 to 0.5 percent of the surface area of the multistage polymer particles.

The article of the present invention provides thermal paper with improved printing performance.

DETAILED DESCRIPTION OF THE INVENTION

The present invention is a coated paper article comprising:
a) a 40-µm to 500-µm thick paper substrate;
b) a 2-µm to 10-µm thick basecoat layer comprising porous multistage polymer particles and a binder; and
c) a 1-µm to 30-µm thick thermosensitive recording layer;
wherein the basecoat layer is disposed between the thermosensitive recording layer and the paper substrate;
wherein the porous multistage polymer particles have a shell-hollow core morphology, and a number-weighted average particle size in the range of from 500 nm to 3 µm;
wherein the shell comprises from 0.5 to 10 weight percent structural units of a salt of a carboxylic acid monomer, and from 90 to 99.5 weight percent structural units of styrene;
wherein at least 98 weight percent of the shell comprises structural units of styrene and the salt of the carboxylic acid monomer; and
wherein the pore area percent is in the range of from 0.005 to 0.5 percent of the surface area of the multistage polymer particles.

The basecoat layer comprises a binder and multistage polymer particles that have a) a hollow core-shell morphology (HSPs) and b) pores, which are channels extending from the surface of the particle to the hollow core. The porous HSPs are advantageously prepared as follows: A dispersion of first stage polymer particles is prepared by reacting methyl methacrylate with methyl acrylate under aqueous emulsion polymerization conditions to form an aqueous dispersion of first stage polymer particles having a z-average particle size as measured by dynamic light scattering in the range of from 200 nm or 300 nm to 750 or to 600 nm. The dispersion of first stage polymer particles is then reacted with styrene and a carboxylic acid monomer under aqueous emulsion polymerization conditions to form an aqueous dispersion of solid polymer particles comprising a first stage with structural units of methyl acrylate and methyl methacrylate, and a second stage (i.e., a shell) with structural units of styrene and a carboxylic acid monomer.

Examples of carboxylic acid monomers include acrylic acid, methacrylic acid, and itaconic acid, with acrylic acid being preferred. At least 98, or at least 99, or at least 99.5 weight percent of the second stage comprises structural units of styrene and the carboxylic acid monomer or a salt thereof. Preferably, the second stage comprises less than 1 weight percent, or less than 0.5 weight percent, or less than 0.1 weight percent or 0 weight percent structural units of any $C_1$-$C_{20}$ alkyl acrylate or methacrylate or any $C_3$-$C_{20}$ cycloalkyl acrylate or methacrylate. The weight-to-weight ratio of monomers used to prepare the second stage and monomers used to prepare the first stage (i.e., the stage 2: stage 1 ratio) is preferably in the range of from 5:1 or 7:1 or 8:1, to 12:1 or 10:1 or 9:1.

The aqueous dispersion of the non-porous multistage polymer particles is then converted to an aqueous dispersion of multistage porous polymer particles under conditions sufficient to hydrolyze the methyl acrylate to acrylic acid or a salt thereof. Hydrolysis can be carried out, for example, by contacting the dispersion of non-porous polymer particles with NaOH at a temperature in the range of 100° C. to 150° C. at high pressure. The hydrolysis yields swollen porous core-shell polymer particles wherein the core, which is the first stage polymer, comprises water and structural units of methyl methacrylate and sodium acrylate, and the shell, which is the second stage polymer, comprises at least 98 weight percent structural units of styrene and a salt of a carboxylic acid monomer. The core becomes hollow upon evaporation of water. The average diameter particle size of the swollen porous multistage polymer particles is in the range of from 500 nm, or from 750 nm, or from 900 nm, to 3 µm or to 2 µm or to 1.8 µm or to 1.5 µm or to 1.2 µm.

The pore area percent is in the range of from 0.005 or from 0.01, to 0.5 or to 0.2 or to 0.1 or to 0.06 percent of the area of the multistage polymer particles. The void fraction of the porous HSPs is typically in the range of from 60% to 75% or to 70% or to 65%.

The thermosensitive recording material typically comprises a leuco dye and a color developer (see U.S. Pat. No. 4,929,590) and may also comprise a variety of other additives including binders, fillers, crosslinking agents, surface active agents, sensitizers, and thermofusible materials. The thermal paper can be prepared by methods known in the art such as the method described in the Example section.

EXAMPLES

Percent Void Fraction Determination

The particle void fraction is determined using the following procedure. To a 50-mL polypropylene centrifuge tube (with hemispherical bottom) is added latex containing the porous polymers (40 g). The tube is placed in a centrifuge and is spun at 18,500 rpm for 120 min. The clear supernatant is decanted from the hard pack and weighed. From the latex mass, percent solids and supernatant mass, the percent void fraction (% VF) is determined using the following equations:

$$W_{S_0} = W_T - \frac{W_T * (\% \text{ Solids})}{k}$$

$$\% \ VF = \frac{W_{S_0} - W_S}{W_T - W_S} * 100\%$$

$W_T$=Total weight of sample in the tube. The polymer densities are close to 1 and so weights are used in place of volumes.

% Solids=Solids content of the latex k=Packing factor, 0.675, for random packing of unswollen monodisperse spheres. The packing factor accounts for the fact that some water will be trapped between the spheres in the hard pack.

Measurement of Particle Size

The size of the hollow sphere particles was measured based on the scanning electron micrographs (SEM). Two drops of the emulsions were drop-cast on a conductive carbon tape on an aluminum SEM tab. After drying for 2 h at ambient temperature, the samples were coated with a thin layer of chromium in an EMS 150T ES metal coater using 100 mA sputter current for 100 s. The SEMs were acquired at 5 kV acceleration voltage from a Schottky Field Emission electron source using an Everhart-Thornley secondary electron detector in a Thermo Fisher Nova NanoSEM 630 scanning electron microscope. All images were acquired at 20,000× magnification with an image size of 1024×884 pixels and a bit depth of 8 (grayscale ranges from 0 to 255, with 0 being the darkest and 255 being the brightest). All images had a horizontal field of view of 7.46 μm and a pixel size of 7.28 nm. Each image contained 40 to 60 hollow sphere particles. Two images were analyzed for each sample using the ImageJ software (version 1.53c). The diameter was measured manually for all particles in the image except for those at the edges of the images. The number-weighted average particle size and the standard deviation were reported.

Measurement of Pore Area Percent

Pore area percent was measured using the same SEMs used to measure particle size. Two images were analyzed for each sample using the ImageJ software (version 1.53c). All images were preprocessed using the "smooth" command in ImageJ followed by the "enhance contrast" command with 0.3% saturated pixels and the "normalize" option enabled. The pores appeared as dark areas on the bright particle surface in the micrographs; to isolate pores for area measurement, a grayscale value of 60 was used as the segmentation threshold. The bright pixels with grayscale values between 61 and 255 constituted the particle, and their total area was recorded as $A_{particle}$. The dark pixels with grayscale values between 0 and 60 constituted either the pores or the interstitial sites (the dark areas in between the particles). Two additional constraints were used to differentiate between the pores and the interstitial sites: The size of the pores was between 9 and 800 pixels, and the circularity was between 0.70 and 1.00. Any interstitial sites incorrectly selected by the software using these criteria were manually excluded from the selection. After these adjustments, the total area of the selected pores was recorded as $A_{pore}$. The pore area percent was then defined by the following equation $$\text{Pore Area Percent} = \frac{A_{pore}}{A_{particle} + A_{pore}} \times 100\%$$

Intermediate Example 1—Preparation of an Aqueous Dispersion of Porous Hollow Sphere Polymer Particles A. Preparation of First Stage Polymer Dispersion Deionized water (1630.00 g), and glacial acetic acid (0.50 g) were charged to a 5-L, 4-necked round bottom flask and heated to 92° C. under $N_2$. In a separate vessel, a monomer emulsion containing DI water (335.33 g), sodium dodecylbenzene sulfonate (30.22 g, 22.5% in water), methyl methacrylate (940.40 g), and methyl acrylate (681.00 g) was prepared. An initiator solution of sodium persulfate (3.02 g) in DI water (90 g) and a buffer solution of sodium bicarbonate (0.27 g) in DI water (90 g) were also prepared. A solution of sodium persulfate (1.51 g) in DI water (20 g) was charged to the reactor and rinsed with DI water (10 g). An acrylic seed polymer dispersion (55.39 g, 45.6% solids, 100 nm) was charged to the reactor and rinsed with DI water (10 g). The monomer emulsion, initiator solution and buffer solution were then fed to the reactor over 180 min while maintaining the reaction at 90° C. Upon completion of the feeds the vessels were rinsed with DI water (50 g total) and the reaction held at 90° C. for 15 min before cooling to room temperature. The resulting Core Polymer Dispersion had a solids content of 41.7 wt. %.

B. Preparation of Dispersion of Non-Porous Multistage Polymer Particles

Deionized water (1668.00 g), and glacial acetic acid (0.50 g) were charged to a 5-L, 4-necked round bottom flask and heated to 95° C. under $N_2$. In a separate vessel, a monomer emulsion containing DI water (112.30 g), sodium dodecylbenzene sulfonate (3.15 g, 22.5% in water), styrene (712.73 g), and acrylic acid (29.37 g) was prepared. A solution of sodium persulfate (2.18 g) in DI water (20 g) was charged to the reactor and rinsed with water (5 g). A portion of Part A first stage polymer dispersion (231.24 g) was charged to the reactor and rinsed with DI water (20 g). The monomer emulsion was fed to the reactor over 100 min while maintaining the reaction at 90° C. Upon completion of the monomer emulsion feed the monomer emulsion vessel was rinsed with DI water (40 g) and the reaction held at 90° C. for 45 min before cooling to room temperature. The resulting dispersion of non-porous multistage polymer particles had a solids content of 28.8 wt. %.

C. Preparation of an Aqueous Dispersion of Porous Polymer Particles

A portion of Intermediate 1B (205.9 g) was mixed with DI water (95.8 g) and a sodium hydroxide solution (5% in water, 49.5 g). The resulting dispersion was charged to a pressure vessel and heated to 140° C. After 6 h, the vessel was cooled to room temperature and the swollen porous particle dispersion removed. The dispersion of porous polymer particles had a final pH of 11.5, a solids content of 17.8 wt. %, a number weighted particle size of 1.03±0.06 μm, a void fraction of 61.7%, and a pore area percentage of 0.03 area percent.

Intermediate Example 2—Preparation of Basecoat Formulation

A portion of Intermediate Example 1C (67.4 g), RHOPLEX™ P-308 Styrene-Acrylic Binder (P-308, 4.5 g, 50 wt. % solids, A Trademark of The Dow Chemical Company or its Affiliates), and #67710 Polyvinyl Alcohol (PVOH, 5 g, 15 wt. % in demineralized water, Kremer Pigmente) were mixed in a vessel with an overhead blade mixer, then diluted with DI water (23.1 g) to adjust to 17 wt. % solids.

Comparative Intermediate Example 1—Preparation of an Aqueous Dispersion of Porous Polymer Particles The procedure for Intermediate Example 1 was substantially repeated except that styrene (696.50 g), methyl acrylate (37.10 g), and acrylic acid (8.50 g) were used to prepare the non-porous multistage dispersion. The resulting dispersion was found to a solids content of 29.0 wt. %. The porous dispersion was prepared by reacting a portion of the non-porous multistage dispersion (203.9 g) with DI water (80.40 g) and a sodium hydroxide solution (68.2 g, 5 wt. % in water). The dispersion of porous polymer particles had a final pH of 12.7, a solids content of 18.4 wt. %, a number weighted particle size of 0.98±0.07 μm, a void fraction of 63.2%, and a pore area percentage of 1.06 area percent.

Comparative Intermediate Example 2—Preparation of an Aqueous Dispersion of Porous Polymer Particles The procedure for Intermediate Example 1 was substantially repeated except that styrene (659.40 g), methyl acrylate (74.20 g), and acrylic acid (8.50 g) were used to prepare the non-porous multistage dispersion. The resulting dispersion was found to a solids content of 28.3 wt. %. The porous dispersion was prepared by reacting a portion of the non-porous dispersion (209.4 g) with DI water (55.48 g) and a sodium hydroxide solution (97.3 g, 5 wt. % in water). The dispersion of porous polymer particles had a final pH of 13.0, a solids content of 18.4 wt. %, a number weighted particle size of 0.93±0.06 μm, a void fraction of 62.6%, and a pore area percentage of 1.71 area percent.

Comparative Intermediate Example 3—Preparation of Basecoat Formulation

A portion of the aqueous dispersion of porous polymer particles from Comparative Intermediate Example 1 (67.2 g), P-308 (4.5 g), and PVOH (5 g) were mixed in a vessel with an overhead blade mixer, then diluted with DI water (23.4 g) to adjust to 17 wt. % solids.

Comparative Intermediate Example 4—Preparation of Basecoat Formulation

A portion of the aqueous dispersion of porous hollow sphere particles from Comparative Intermediate Example 2 (66.2 g), P-308 (4.5 g), and PVOH (5 g) were mixed in a vessel with an overhead blade mixer, then diluted with DI water (24.3 g) to adjust to 17 wt. % solids.

Intermediate Example 3—Thermosensitive Recording Layer Formulation

Materials and formulations were obtained from Nissho Kogyo Co, LTD. DI water (51.6 g) was placed into an 8 oz. container, followed in order by the addition of Tunex-E precipitated calcium carbonate (4.4 g), P-603 Mizucasil silica dioxide (3.7 g), PVA-203 buffer (1.0 g, Kuraray 15% wt), D-8 4-hydroxy-4'-isopropoxydiphenylsulfone Developer (8.8 g, Mitsubishi, 50% wt %), 2-benzyl-oxy-napthalene Sensitizer (4.0 g, 40% wt), PVA-117 Binder (15.8 g, Kuraray, 10% wt.), zinc stearate Lubricant (3.1 g, 36% wt), and PSD-290 2-anilino-6-(dibutylamino)-3-methylfluoran Dye (5.7 g, Mitsubishi, 35% wt.), and mixed with an overhead blade mixer.

Examples 1 and Comparative Examples 2 and 3—Preparation of Coated Paper with Image Layer NewPage freesheet paper (basis weight: 58 g/m$^2$, roughness: 4.00 μm, Gurley porosity: 24.6 s) was cut to 37.9 cm×20.1 cm with the long side in the machine direction, then placed at a controlled temperature room (72° F. (22° C.) and 50% humidity) for at least 2 h. The paper was taped using masking tape to a piece of copy paper that was attached to a hand-drawdown plate with masking tape. Then, a bead of basecoat formulation was pipetted onto the masking tape above the freesheet. A wire wound rod was then manually moved down over the strip of basecoat formulation, and across the paper so that the paper would be coated evenly. The paper was then exposed to hot air for 45 s, after which time the paper was transferred to an oven and dried at 80° C. for an additional 45 s. After drying, the paper was conditioned in a controlled temperature room (72° F. and 50% humidity) for 2 h. This paper with basecoat was then coated with an image layer with the same procedure used to apply the basecoat, and dried for 1 min at 80° C.

Measurement of Dynamic Sensitivity

Fully coated paper was cut in the machine direction into two strips 2.5" (1 cm) wide. The two strips were taped end to end and printed using an Atlantek Paper Tester Model 200, and dynamic sensitivity was measured using following print conditions were used:
 a) sequence dot pulse duration=0.8 ms
 b) full cycle time ($T_{cycle}$)=5.0 ms
 c) printhead temperature=30° C.
 d) print head resistance=583 ohms at an applied voltage of 20.6 V A 50% 80×80 checkerboard pattern was printed with print energies of 0.05, 0.10, 0.15, 0.20, 0.25, 0.30, 0.35, 0.40, 0.45, and 0.50 mJ/dot. The optical densities of 3 boxes for each print energy were measured using a handheld X-rite 428 spectrodensitometer.

The optical density of the Example 1 coated paper was found to be 0.59 at a print energy of 0.2 mJ. In contrast, the optical densities of comparative Example 1 and 2 coated papers were found to be 0.49 and 0.41 respectively at the same print energy. The porous HSPs had similar void fractions (between 61.7% to 63.1%); nevertheless, basecoats containing HSPs with a markedly smaller pore area percent resulted in a coated paper with increased optical density at a given print energy.

The invention claimed is:

1. A coated paper article comprising:
   a) a 40-μm to 500-μm thick paper substrate;
   b) a 2-μm to 10-μm thick basecoat layer comprising porous multistage polymer particles and a binder; and
   c) a 1-μm to 30-μm thick thermosensitive recording layer;
   wherein the basecoat layer is disposed between the thermosensitive recording layer and the paper substrate;
   wherein the porous multistage polymer particles have a shell-hollow core morphology, and a number-weighted average particle size in the range of from 500 nm to 3 μm;
   wherein the shell comprises from 0.5 to 10 weight percent structural units of a salt of a carboxylic acid monomer, and from 90 to 99.5 weight percent structural units of styrene;
   wherein at least 98 weight percent of the shell comprises structural units of styrene and the salt of the carboxylic acid monomer; and
   wherein the porous multistage polymer particles have a pore area percent in the range of from 0.005 to 0.5 percent of the surface area of the multistage polymer particles as determined by the measurement method described herein.

2. The coated paper article of claim 1 wherein at least 99 weight percent of the shell of the multistage polymer particles comprises structural units of styrene, wherein the salt of a carboxylic acid monomer is a salt of acrylic acid or a salt of methacrylic acid thereof or methacrylic acid or a salt thereof.

3. The coated paper article of claim 1 wherein the shell of the porous multistage polymer particles comprises less than 0.5 weight percent structural units of any $C_1$-$C_{20}$ alkyl acrylate or methacrylate.

4. The coated paper article of claim 1 wherein the shell of the porous multistage polymer particles comprises less than 0.5 weight percent structural units of any $C_3$-$C_{20}$ cycloalkyl acrylate or methacrylate.

5. The coated paper article of claim 2 wherein the number-weighted average particle size of the porous multistage polymer particles is in the range of from 750 nm to 1.5 μm.

6. The coated paper article of claim 5 wherein the average area percent is in the range of from 0.01 to 0.1 percent of the surface area of the porous multistage polymer particles; and the number-weighted average particle size of the porous multistage polymer particles is in the range of from 900 nm to 1.2 μm.

7. The coated paper article of claim 6 wherein the porous multistage polymer particles have a void fraction in the range of from 60% to 75%.

8. The coated paper article of claim 6 wherein the porous multistage polymer particles have a void fraction in the range of from 60% to 70%.

* * * * *